United States Patent [19]
Bourg

[11] Patent Number: 6,153,656
[45] Date of Patent: Nov. 28, 2000

[54] DEMULSIFICATION OF OIL AND WATER EMULSIONS

[75] Inventor: Douglas F. Bourg, Houma, La.

[73] Assignee: Phillips Petroleum Company, Bartlesville, Okla.

[21] Appl. No.: 09/259,174

[22] Filed: Feb. 26, 1999

[51] Int. Cl.[7] .............................. B01D 17/05; C09K 3/00
[52] U.S. Cl. .................. 516/183; 210/708; 507/921; 516/184; 516/190
[58] Field of Search .................................. 516/183, 184, 516/190; 210/708; 525/143; 507/921

[56] References Cited

U.S. PATENT DOCUMENTS

| | | | |
|---|---|---|---|
| 2,499,365 | 3/1950 | De Groote et al. | 252/338 |
| 2,542,009 | 2/1951 | De Groote et al. | 516/184 |
| 3,687,845 | 8/1972 | Treat et al. | 516/190 X |
| 4,337,828 | 7/1982 | Blair, Jr.. | 166/274 |
| 4,439,345 | 3/1984 | Duke | 516/190 X |
| 4,446,054 | 5/1984 | Bessler | 252/344 |
| 4,814,094 | 3/1989 | Blair, Jr. et al. | 252/8.554 |
| 5,128,046 | 7/1992 | Marble et al. | 210/708 X |
| 5,472,617 | 12/1995 | Barthold et al. | 516/184 X |
| 5,661,220 | 8/1997 | Faul et al. | 516/184 X |

*Primary Examiner*—Richard D. Lovering
*Attorney, Agent, or Firm*—Jeffrey R. Anderson

[57] ABSTRACT

A composition comprising an oxyalkylated phenol-aldehyde resin and an acrylic acid component wherein the ratio by weight of oxyalkylated phenol-aldehyde resin to an acrylic acid component is in the range of from about 0.2:1 to about 4:1 is disclosed. The thus-obtained composition is employed in a process for demulsifying an oil and water emulsion which comprises adding the composition to the oil and water emulsion to thereby form a mixture and permitting a phase separation to occur, by known methods, e.g. settling, to thereby produce a hydrocarbon phase and a water phase. In an alternative embodiment, a process for emulsifying an oil and water emulsion which comprises adding an oxyalkylated phenol-aldehyde resin and an acrylic acid component to the oil and water emulsion to thereby form a mixture and permitting a phase separation to occur to thereby produce a hydrocarbon phase and a water phase is disclosed.

29 Claims, No Drawings

DEMULSIFICATION OF OIL AND WATER EMULSIONS

This invention relates to compositions and processes for demulsifying oil and water emulsions. More particularly, this invention relates to demulsifying petroleum oil and water emulsions.

BACKGROUND OF THE INVENTION

Oil and water emulsions are commonly formed, and/or present, in the oil-field production industry, the petroleum refining industry, the petrochemical industry, activities related to such industries, such as the transportation of oil and oil products, and other industries which can produce oil and water emulsions, such as the food preparation industry.

For instance, in oil field production, additional oil can be recovered from a formation by waterflooding. This technique of oil recovery involves the injection of water into the oil production formation in secondary or tertiary water floods thereby displacing the oil. The success of a water flood operation is dependent on the effectiveness by which the water replaces oil from the pores of the rock or sand formation. One technique used to achieve this displacement is to reduce the interfacial tension between the oil and water phases. The addition of surfactants to the injection fluids reduces the interfacial tension between the oil and water phases. The net result is an improved displacement of oil from the pores of the formation.

However, the use of surfactants to reduce the interfacial tension causes a stable oil and water emulsion to be formed.

Emulsions in the petroleum refining industry can include emulsions prepared under controlled conditions from crude oil and relatively soft waters or weak brines (crude desalting). Controlled emulsification and subsequent demulsification are of significant value in removing impurities, particularly inorganic salts from crude oil.

Other emulsions can be formed in the waste oil recovery systems in the petroleum refining and petrochemical industries.

Emulsions can also be formed as a result of oil spills on water, at the interface between the oil spilled and the water.

These emulsions can be difficult and expensive to demulsify by application of the usual demulsifiers and treating techniques. In addition, the demulsifying of emulsions is not only useful for the recovery of the oil but is also, in many cases, necessary in order to discharge the wastewater from such processes. In fact, the cost to treat such waste waters to acceptable levels of oil for discharge can be quite high and can include the use of processing equipment, such as clarifiers.

Therefore, it is desirable to develop compositions and processes which demulsify emulsions economically and rapidly and that provide water with low oil content.

SUMMARY OF THE INVENTION

It is an object of this invention to provide a novel composition effective for demulsifying oil and water emulsions.

It is another object of this invention to provide an improved process for demulsifying oil and water emulsions.

It is yet another object of this invention to provide a process for demulsifying oil and water emulsions producing a water phase having a low concentration of oil.

It is still another object of this invention to provide a process for demulsifying oil and water emulsions which is rapid and economical.

The invention includes a novel composition for use in demulsifying oil and water emulsions. This novel composition comprises an oxyalkylated phenol-aldehyde resin and an acrylic acid component. The inventive process provides for the demulsification of an oil and water emulsion and comprises adding an oxyalkylated phenol-aldehyde resin and an acrylic acid component to the emulsion to thereby form a mixture and permitting a phase separation to occur in the mixture, by known methods e.g. settling, to thereby produce a hydrocarbon phase and a water phase.

Other objects and advantages of the invention will become apparent from the detailed description and the appended claims.

DETAILED DESCRIPTION OF THE INVENTION

The inventive composition comprises, consists essentially of, or consists of at least one oxyalkylated phenol-aldehyde resin and an acrylic acid component.

Any oxyalkylated phenol-aldehyde resin effective for demulsifying an oil and water emulsion can be used in the present invention.

More particularly, the oxyalkylated phenol-aldehyde resins useful in the present invention include those described in the M. De Groote et al., U.S. Pat. No. 2,499,365, and the Bessler U.S. Pat. No. 4,446,054, the entire disclosures of which are expressly incorporated herein by reference. These patents, U.S. Pat. No. 2,499,365 and U.S. Pat. No. 4,446,054, further describe in detail the preparation of such oxyalkylated phenol-aldehyde resins.

The phenol group of the oxyalkylated phenol-aldehyde resin can be a substituted phenol. Examples of suitable substitutes include, but are not limited to, an alkyl group and an aryl group.

The acrylic acid component comprises at least one composition selected from the group consisting of acrylic acid, polyacrylic acid, methacrylic acid, ethacrylic acid, n-butacrylic acid, polymethacrylic acid, polyethacrylic acid, polybutacrylic acid, acrylate, methyl acrylate, ethyl acrylate, n-butyl acrylate, polyacrylate, poly(methylacrylate), poly(ethylacrylate), poly(n-butylacrylate), acrylic acid copolymers, and combinations of any two or more thereof.

The ratio by weight of the oxyalkylated phenol-aldehyde resin to the acrylic acid component in the composition or process of the present invention can be any ratio effective for demulsifying an oil and water emulsion. More particularly, the weight ratio of the oxyalkylated phenol-aldehyde resin to the acrylic acid component is in the range of from about 0.2:1 to about 4:1; preferably from about 0.5:1 to about 2:1; and most preferably from 0.8:1 to 1.5:1.

In another embodiment of the invention, at least one oxyalkylated phenol-aldehyde resin and an acrylic acid component can be added to an oil and water emulsion to thereby form a mixture. The mixture is permitted to separate into a hydrocarbon phase predominantly comprising hydrocarbons and a water phase predominantly comprising water. The oxyalkylated phenol-aldehyde resin and the acrylic acid component can be added to the oil and water emulsion as separate components or as a part of the above described inventive composition.

The concentration of the oxyalkylated phenol-aldehyde resin and the concentration of the acrylic acid component present in the mixture can be any concentrations sufficient to effectively demulsify an oil and water emulsion.

More particularly, the amount of oxyalkylated phenol-aldehyde resin present in the mixture can be an amount sufficient to provide a concentration in the range of from about 8 to about 30 ppmw (parts per million weight), preferably from about 10 to about 20 ppmw, and most preferably from 13 to 15 ppmw, based on the total weight of the oil in the mixture.

The amount of acrylic acid component present in the mixture can be an amount sufficient to provide a concentration in the range of from about 8 to about 30 ppmw, preferably from about 10 to about 20 ppmw, and most preferably from 11 to 15 ppmw, based on the total weight of the water in the mixture.

At least a portion of the hydrocarbon phase can be recovered and sent downstream for further processing and at least a portion of the water phase can be removed and disposed of as a direct point source discharge, if the water quality is sufficient to do so, or routed to a downstream waste water treatment system. Where the oil and water emulsion is treated offshore, at least a portion of the water phase can be disposed directly offshore, again, if the water quality permits.

The oil and water emulsion which can be demulsified by the inventive composition or process can be any oil and water emulsion, whether intentionally or unintentionally formed. Non-limiting examples of such oil and water emulsions include those described above in the "Background of the Invention" which are formed in the oil-field production industry, the petroleum refining industry, the petrochemical industry, activities related to such industries, such as the transportation of oil and oil products, and other industries which can produce oil and water emulsions, such as the food preparation industry.

The invention is best suited to the demulsification of oil and water emulsions formed in the oil-field production industry. In particular, such oil and water emulsions include, but are not limited to, emulsions resulting from the production of crude oil from a subsurface crude oil production formation. These oil-field emulsions comprise produced oil, primarily comprising crude oil, and produced water.

Where the subsurface crude oil production formation is located offshore, the disposal of produced water can be extremely expensive due to the expense of installing water treatment equipment (such as clarifiers), suitable for use in harsh offshore environments, on offshore production units which have extremely limited available space. In addition, the cost of chemicals required to treat typical oil and water emulsions can be quite high. The inventive composition and/or process substantially reduces demulsification costs and, more particularly, the costs associated with treating the water to a quality sufficient for disposal. These cost savings include reduced chemical costs and, in some instances, avoiding the cost of water treatment equipment that would otherwise be required.

The following example is presented to further illustrate this invention and is not to be construed as unduly limiting its scope.

EXAMPLE

This example illustrates the use of the inventive composition and/or process for demulsifying oil and water emulsions formed at several off-shore platform locations in the Gulf of Mexico.

All chemical additions are continuous using electric or pneumatic pumps.

| Site Number | Treating Agent | Treating Agent Concentration[5], ppmw | Oil and Grease[6] of produced water mg/l |
|---|---|---|---|
| 1 | DMO8204[1] | 45 | 45–60 |
| 1 | DMO8204[1] | 45 | 12–20 |
|   | SCW4013[2] | 25 |   |
| 2 | DMO8215[3] | 60 | 90–120 |
| 2 | DMO8215[3] | 60 | 40–50 |
|   | SCW4013[2] | 30 |   |
| 3 | DMO8215[3] | 60 | 65–85 |
| 3 | DMO8215[3] | 60 | 35–45 |
|   | SCW4013[2] | 30 |   |
| 4 | DMO2532G[4] | 48 | 29–38 |
| 4 | DMO2532G[4] | 48 | 15–25 |
|   | SCW4013[2] | 30 |   |

[1]DMO8204 is a product designation for a product marketed by Baker-Petrolite which comprises 30%, by volume, oxyalkylated phenolaldehyde resin.
[2]SCW4013 is a product designation for a product marketed by Baker-Petrolite which comprises 45%, by volume, polyacrylic acid.
[3]DMO8215 is a product designation for a product marketed by Baker-Petrolite which comprises 24%, by volume, oxyalkylated phenolaldehyde resin.
[4]DMO2532 is a product designation for a product marketed by Baker-Petrolite which comprises 43%, by volume, oxyalkylated phenolaldehyde resin.
[5]The Treating Agent concentration for DMO8204 and DMO8215 is based on the total weight of oil (hydrocarbons) in the tank; and the Treating Agent concentration for SCW4013 is based on the total weight of water in the tank.
[6]Oil and grease concentrations were determined using the ASTM D3921-96 test.

From the results presented in the Table, it is readily apparent that the inventive composition is highly effective in demulsifying oil and water emulsions. It is also readily apparent that the inventive process using an oxyalkylated phenol-aldehyde resin and a polyacrylic acid component provides increased oil and grease removal from the produced water as compared to the control process which uses an oxyalkylated phenol-aldehyde resin alone.

Reasonable variations, modifications, and adaptations can be made within the scope of the disclosure and the appended claims without departing from the scope of this invention.

That which is claimed is:

1. A demulsifier composition comprising an oxyalkylated phenol-aldehyde resin and an acrylic acid component wherein the ratio by weight of said oxyalkylated phenol-aldehyde resin to said acrylic acid component is in the range of from about 0.2:1 to about 4:1.

2. A demulsifier composition as recited in claim 1 wherein the ratio by weight of said oxyalkylated phenol-aldehyde resin to said acrylic acid component is in the range of from about 0.5:1 to about 2:1.

3. A demulsifier composition as recited in claim 1 wherein the ratio by weight of said oxyalkylated phenol-aldehyde resin to said acrylic acid component is in the range of from 0.8:1 to 1.5:1.

4. A demulsifier composition as recited in claim 1 wherein said acrylic acid component comprises at least one member selected from the group consisting of acrylic acid, polyacrylic acid, methacrylic acid, ethacrylic acid, n-butacrylic acid, polymethacrylic acid, polyethacrylic acid, polybutacrylic acid, acrylate, methyl acrylate, ethyl acrylate, n-butyl acrylate, polyacrylate, poly(methylacrylate), poly(ethylacrylate), poly(n-butylacrylate), acrylic acid copolymers, and combinations of any two or more thereof.

5. A process for demulsifying an oil and water emulsion which comprises adding an oxyalkylated phenol-aldehyde resin and an acrylic acid component to said oil and water emulsion to thereby form a mixture and permitting a phase separation to occur within said mixture to thereby produce a hydrocarbon phase and a water phase.

6. A process as recited in claim 5 wherein said oxyalkylated phenol-aldehyde resin is present in said mixture in an amount sufficient to provide a concentration in the range of from about 8 ppmw to about 30 ppmw, based on the total weight of oil in said mixture; and said acrylic acid component is present in said mixture in an amount sufficient to provide a concentration in the range of from about 8 ppmw to about 30 ppmw, based on the total weight of water in said mixture.

7. A process as recited in claim 5 wherein said oxyalkylated phenol-aldehyde resin is present in said mixture in an amount sufficient to provide a concentration in the range of from about 10 ppmw to about 20 ppmw, based on the total weight of oil in said mixture; and said acrylic acid component is present in said mixture in an amount sufficient to provide a concentration in the range of from about 10 ppmw to about 20 ppmw, based on the total weight of water in said mixture.

8. A process as recited in claim 5 wherein said oxyalkylated phenol-aldehyde resin is present in said mixture in an amount sufficient to provide a concentration in the range of from 13 ppmw to 15 ppmw, based on the total weight of oil in said mixture; and said acrylic acid component is present in said mixture in an amount sufficient to provide a concentration in the range of from 11 ppmw to 15 ppmw, based on the total weight of water in said mixture.

9. A process as recited in claim 5 wherein said oil and water emulsion comprises produced oil and produced water from a subsurface crude oil production formation.

10. A process as recited in claim 5 wherein said acrylic acid component comprises at least one member selected from the group consisting of acrylic acid, polyacrylic acid, methacrylic acid, ethacrylic acid, n-butacrylic acid, polymethacrylic acid, polyethacrylic acid, polybutacrylic acid, acrylate, methyl acrylate, ethyl acrylate, n-butyl acrylate, polyacrylate, poly(methylacrylate), poly(ethylacrylate), poly(n-butylacrylate), acrylic acid copolymers, and combinations of any two or more thereof.

11. A process as recited in claim 5 wherein at least a portion of said hydrocarbon phase is recovered and at least a portion of said water phase is disposed.

12. A process as recited in claim 11 wherein said oil and water emulsion comprises produced oil and produced water from a subsurface crude oil production formation.

13. A process as recited in claim 12 wherein said oil and water emulsion is demulsified offshore and said at least a portion of said water phase is disposed offshore.

14. A process for demulsifying an oil and water emulsion which comprises adding the demulsifier composition of claim 1 to said oil and water emulsion to thereby form a mixture and permitting a phase separation to occur to thereby produce a hydrocarbon phase and a water phase.

15. A process as recited in claim 14 wherein said oxyalkylated phenol-aldehyde resin is present in said mixture in an amount sufficient to provide a concentration in the range of from about 8 ppmw to about 30 ppmw, based on the total weight of oil in said mixture; and said acrylic acid component is present in said mixture in an amount sufficient to provide a concentration in the range of from about 8 ppmw to about 30 ppmw, based on the total weight of water in said mixture.

16. A process as recited in claim 14 wherein said oxyalkylated phenol-aldehyde resin is present in said mixture in an amount sufficient to provide a concentration in the range of from about 10 ppmw to about 20 ppmw, based on the total weight of oil in said mixture; and said acrylic acid component is present in said mixture in an amount sufficient to provide a concentration in the range of from about 10 ppmw to about 20 ppmw, based on the total weight of water in said mixture.

17. A process as recited in claim 14 wherein said oxyalkylated phenol-aldehyde resin is present in said mixture in an amount sufficient to provide a concentration in the range of from 13 ppmw to 15 ppmw, based on the total weight of oil in said mixture; and said acrylic acid component is present in said mixture in an amount sufficient to provide a concentration in the range of from 11 ppmw to 15 ppmw, based on the total weight of water in said mixture.

18. A process for demulsifying an oil and water emulsion which comprises adding the demulsifier composition of claim 2 to said emulsion to thereby form a mixture and permitting a phase separation to occur to thereby produce a hydrocarbon phase and a water phase.

19. A process as recited in claim 18 wherein said oxyalkylated phenol-aldehyde resin is present in said mixture in an amount sufficient to provide a concentration in the range of from about 8 ppmw to about 30 ppmw, based on the total weight of oil in said mixture; and said acrylic acid component is present in said mixture in an amount sufficient to provide a concentration in the range of from about 8 ppmw to about 30 ppmw, based on the total weight of water in said mixture.

20. A process as recited in claim 18 wherein said oxyalkylated phenol-aldehyde resin is present in said mixture in an amount sufficient to provide a concentration in the range of from about 10 ppmw to about 20 ppmw, based on the total weight of oil in said mixture; and said acrylic acid component is present in said mixture in an amount sufficient to provide a concentration in the range of from about 10 ppmw to about 20 ppmw based on the total weight of water in said mixture.

21. A process as recited in claim 18 wherein said oxyalkylated phenol-aldehyde resin is present in said mixture in an amount sufficient to provide a concentration in the range of from 13 ppmw to 15 ppmw, based on the total weight of oil in said mixture; and said acrylic acid component is present in said mixture in an amount sufficient to provide a concentration in the range of from 11 ppmw to 15 ppmw, based on the total weight of water in said mixture.

22. A process for demulsifying an oil and water emulsion which comprises adding the demulsifier composition of claim 3 to said emulsion to thereby form a mixture and permitting a phase separation to occur to thereby produce a hydrocarbon phase and a water phase.

23. A process as recited in claim 22 wherein said oxyalkylated phenol-aldehyde resin is present in said mixture in an amount sufficient to provide a concentration in the range of from about 8 ppmw to about 30 ppmw, based on the total weight of oil in said mixture; and said acrylic acid component is present in said mixture in an amount sufficient to provide a concentration in the range of from about 8 ppmw to about 30 ppmw, based on the total weight of water in said mixture.

24. A process as recited in claim 22 wherein said oxyalkylated phenol-aldehyde resin is present in said mixture in an amount sufficient to provide a concentration in the range of from about 10 ppmw to about 20 ppmw, based on the total weight of oil in said mixture; and said acrylic acid component is present in said mixture in an amount sufficient to provide a concentration in the range of from about 10 ppmw to about 20 ppmw, based on the total weight of water in said mixture.

25. A process as recited in claim 22 wherein said oxyalkylated phenol-aldehyde resin is present in said mixture in an amount sufficient to provide a concentration in the range of from 13 ppmw to 15 ppmw, based on the total weight of oil in said mixture; and said acrylic acid component is present in said mixture in an amount sufficient to provide a concentration in the range of from 11 ppmw to 15 ppmw, based on the total weight of water in said mixture.

26. A process for demulsifying an oil and water emulsion which comprises adding the demulsifier composition of claim 4 to said emulsion to thereby form a mixture and permitting a phase separation to occur to thereby produce a hydrocarbon phase and a water phase.

27. A process as recited in claim 26 wherein said oxyalkylated phenol-aldehyde resin is present in said mixture in an amount sufficient to provide a concentration in the range of from about 8 ppmw to about 30 ppmw, based on the total weight of oil in said mixture; and said acrylic acid component is present in said mixture in an amount sufficient to provide a concentration in the range of from about 8 ppmw to about 30 ppmw, based on the total weight of water in said mixture.

28. A process as recited in claim 26 wherein said oxyalkylated phenol-aldehyde resin is present in said mixture in an amount sufficient to provide a concentration in the range of from about 10 ppmw to about 20 ppmw, based on the total weight of oil in said mixture; and said acrylic acid component is present in said mixture in an amount sufficient to provide a concentration in the range of from about 10 ppmw to about 20 ppmw, based on the total weight of water in said mixture.

29. A process as recited in claim 26 wherein said oxyalkylated phenol-aldehyde resin is present in said mixture in an amount sufficient to provide a concentration in the range of from 13 ppmw to 15 ppmw, based on the total weight of oil in said mixture; and said acrylic acid component is present in said mixture in an amount sufficient to provide a concentration in the range of from 11 ppmw to 15 ppmw, based on the total weight of water in said mixture.

* * * * *